(12) United States Patent
Bâle et al.

(10) Patent No.: US 12,003,788 B2
(45) Date of Patent: Jun. 4, 2024

(54) METHOD AND SYSTEM FOR AUDIO-VISUAL LIVE CONTENT DELIVERY

(71) Applicant: BROADPEAK, Cesson Sevigne (FR)

(72) Inventors: Sophie Bâle, Cesson Sevigne (FR); Rémy Brebion, Cesson Sevigne (FR); Nicolas Renard, Cesson Sevigne (FR); Jean-François Martin, Cesson Sevigne (FR); Pierre-Olivier Bouteau, Cesson Sevigne (FR)

(73) Assignee: BROADPEAK, Cesson Sevigne (FR)

( * ) Notice: Subject to any disclaimer, the term of this patent is extended or adjusted under 35 U.S.C. 154(b) by 0 days.

(21) Appl. No.: 17/296,133

(22) PCT Filed: Nov. 28, 2018

(86) PCT No.: PCT/IB2018/001488
§ 371 (c)(1),
(2) Date: May 21, 2021

(87) PCT Pub. No.: WO2020/109834
PCT Pub. Date: Jun. 4, 2020

(65) Prior Publication Data
US 2021/0314631 A1    Oct. 7, 2021

(51) Int. Cl.
*H04N 21/2187*    (2011.01)
*H04N 21/239*    (2011.01)
(Continued)

(52) U.S. Cl.
CPC ..... *H04N 21/2187* (2013.01); *H04N 21/2393* (2013.01); *H04N 21/43615* (2013.01); *H04N 21/6405* (2013.01); *H04N 21/6408* (2013.01)

(58) Field of Classification Search
CPC ........... H04N 21/2187; H04N 21/2393; H04N 21/43615; H04N 21/6405; H04N 21/6408
See application file for complete search history.

(56) References Cited

U.S. PATENT DOCUMENTS

2002/0143951 A1    10/2002  Khan et al.
2005/0102698 A1*    5/2005  Bumgardner .... H04N 21/43615
                                                    725/74
(Continued)

FOREIGN PATENT DOCUMENTS

EP    2704391 A1    3/2014

OTHER PUBLICATIONS

Jun. 14, 2019 International Search Report issued in International Patent Application No. PCT/IB2018/001488.
(Continued)

*Primary Examiner* — Michael R Telan
(74) *Attorney, Agent, or Firm* — Williams Mullen; R. Brian Drozd

(57) ABSTRACT

An audio-visual live content delivery system includes a client having access to a provider network via a gateway, an audio-visual live content delivering equipment comprising a multicaster for transmitting audio-visual live contents in multicast form via the provider network, a de-multicaster being able to perform a conversion in unicast form of audio-visual live contents received in multicast form from the multicaster, and a controller managing routing of requests to get audio-visual live contents. The client performs a discovery procedure aiming at receiving information on potential presence and availability of the de-multicaster. When the client intends receiving a targeted audio-visual live content, the client sends to the controller a request providing indication of presence and availability, or not, of the de-multicaster. Then the controller decides how redirecting the client to fulfill the request, according at least to the indication of presence and availability, or not, of the de-multicaster.

17 Claims, 8 Drawing Sheets

(51) Int. Cl.
*H04N 21/436* (2011.01)
*H04N 21/6405* (2011.01)
*H04N 21/6408* (2011.01)

(56) References Cited

U.S. PATENT DOCUMENTS

2009/0147718 A1  6/2009  Liu et al.
2010/0113157 A1* 5/2010  Chin .................... A63F 13/358
                                                     463/38
2012/0173746 A1* 7/2012  Salinger ........... H04N 21/64322
                                                    709/230
2016/0337455 A1* 11/2016 Barablin ............. H04L 65/1026

OTHER PUBLICATIONS

Jun. 14, 2019 Written Opinion issued in International Patent Application No. PCT/IB2018/001488.

* cited by examiner

METHOD AND SYSTEM FOR AUDIO-VISUAL LIVE CONTENT DELIVERY

TECHNICAL FIELD

The present invention generally relates to delivering an audio-visual live content to a client device, a gateway device interconnecting a local area network to a provider network, the client device being connected to the local area network, an equipment adapted to provide the audio-visual live content being connected to the provider network.

RELATED ART

In the past, most video live streaming technologies relied on streaming protocols such as RTP ("Real-time Transport Protocol", as defined in the normative document RFC 3550) or RTSP ("Real-Time Streaming Protocol", as defined in the normative document RFC 2326). Today's live streaming technologies are almost exclusively based on the HTTP ("HyperText Transfer Protocol", as defined in the normative document RFC 2616) protocol and designed to work efficiently over large and distributed HTTP networks such as the Internet.

Adaptive Bitrate Streaming (ABS) is one popular HTTP streaming technique used in streaming contents over computer networks and HLS ("HTTP Live Streaming"), which is a live streaming communications protocol based on HTTP and developed by Apple Inc., is one particular implementation. HLS works by breaking the overall AV ("Audio-Visual") stream into a sequence of small HTTP-based file downloads, each containing one chunk of an overall potentially unbounded transport stream. The AV content is available in various resolutions and is divided into chunks, wherein a chunk is a portion of the AV content, whatever is the actual resolution, which corresponds to a time segment of the AV content. As the AV stream is played, a client device decoding the AV content may select from different alternate versions (also referred to as layers or representations) containing the same material encoded at various respective resolutions (various respective bit rates), allowing the streaming session to adapt to available transmission resources of the network and/or available processing resources of the client device. At the start of the streaming session, the client device typically downloads a playlist in the form of a text file with "M3U", or "m3u8", file extension. This text file contains the metadata for the various alternate versions that are available for the concerned AV content.

A similar ABS approach is implemented by Smooth Streaming, which is a feature of Internet Information Services (IIS) Media Services, an integrated HTTP-based media delivery platform provided by Microsoft Corp. Contrary to HLS wherein the AV stream is truncated in plural files containing chunks complemented with playlist files, Smooth Streaming relies on a single AV file truncated into pieces, each piece of file containing a descriptor indicating the concerned layer and a reference time in the AV content. Protocol basis and benefits are however equivalent.

One may similarly consider Adobe Systems' HTTP Dynamic Streaming (HDS) and Dynamic Adaptive Streaming over HTTP, a multimedia streaming technology developed by the Moving Picture Experts Group, and referred to as MPEG DASH, which is related to HDS, HLS and Smooth Streaming. Files with "mpd" file extension are then used.

HTTP-based streaming technologies are very convenient, as HTTP allows going through firewalls and guarantees data integrity by relying on TCP ("Transmission Control Protocol", as defined by the normative document RFC 793). However, the unicast nature of HTTP in the context of ABS is creating huge scalability issues for CDN ("Content Delivery Network") operators that prevent them from adopting ABS-based mechanisms for live streaming. Indeed, HTTP-based streaming technologies rely on unicast transmissions and can therefore be unsustainable in terms of back-end infrastructure, since numerous users may simultaneously request watching an AV live content.

In view of such drawbacks of the HTTP-based streaming technologies for live AV content delivery, many operators rely on multicast-based live streaming technologies. It allows sizing the back-end infrastructure in a more cost-effective way. An improvement has consequently emerged with Multicast-ABR, referred to as M-ABR, as disclosed in the patent document EP 2 704 391 A1. It consists in sending the manifest file, as well as the various representations of the AV live content, as multicast IP ("Internet Protocol", as defined by the normative document RFC 791) packets over a multicast or broadcast medium, thus providing significant consumption reduction of network resources. On network side, there is a so-called multicast server (referred to as multicaster) that basically acquires the manifest and then the corresponding segments from an origin server. The multicaster encapsulates the segments in multicast IP packets using some encapsulation scheme of an intermediate transport protocol. On gateway side, there is a so-called de-multicaster that receives the multicast IP packets by implementing said intermediate transport protocol, and extracts the payload as a media segment ready for feeding a player of the client device by using unicast transmissions. The player requests the segments to the de-multicaster, which acts as a HTTP server from the standpoint of the client device, in a conventional unicast manner (e.g., MPEG DASH) based on segment duration period and on estimated quality/bit rate.

In order to ensure that the client device uses the de-multicaster as a proxy, the patent document EP 2 704 391 A1 discloses a redirection mechanism wherein a CDN controller from which the client device requests the delivery of the AV live content redirects the client device toward the de-multicaster in the gateway interconnecting a local area network (LAN) in which the client device is located and a provider network in which the CDN controller and the multicaster are located.

However, for flexibility considerations, it would be desirable that the CDN controller dynamically determines whether the gateway interconnecting the LAN in which the client device is located and the provider network implements such a de-multicaster and, if any, whether this de-multicaster is able to take in charge the client device in question. It is further desirable to provide a solution that is flexible in terms of effective location of the device that is considered as the CDN controller from the standpoint of the client device, and in particular in which the effective location of the device that is considered as the CDN controller has no consequence on the client device implementation. It is further desirable to provide a solution that is flexible enough for supporting provider networks with no uplink communication capability from the client device (e.g., broadcast network) as well as provider networks with such uplink communication capability.

It is further desirable to provide a solution that operates in the context of adaptive streaming, thus allowing users to benefit from availability of different alternate versions (or representations) of the AV live content encoded at various respective bit rates (or resolutions).

It is also particularly desirable to provide a solution that is simple and cost-effective.

SUMMARY OF THE INVENTION

To that end, the present invention concerns a method for delivering a targeted audio-visual live content to a client, the method being performed by an audio-visual live content delivery system including:

the client located in a local area network interconnected to a provider network by a gateway providing access to the provider network or located in the gateway providing access to the provider network;

an audio-visual live content delivering equipment comprising one or more servers among which a multicaster for transmitting audio-visual live contents in multicast form via the provider network;

a de-multicaster in the gateway providing access to the provider network or in any device located in the local area network, the de-multicaster being able to perform a conversion in unicast form of audio-visual live contents received in multicast form from the multicaster;

a controller managing routing of requests to get audio-visual live contents;

The method comprises:

the client performs a discovery procedure aiming at receiving, from the gateway providing access to the provider network and from any device located in the local area network, information on potential presence and availability of the de-multicaster;

and when the client intends receiving the targeted audio-visual live content:

the client sends to the controller a request to get the targeted audio-visual live content which provides indication of presence and availability, or not, of the de-multicaster;

the controller decides how redirecting the client to fulfill the request to get the targeted audio-visual live content, according at least to the indication of presence and availability, or not, of the de-multicaster.

Thus, by receiving in the request the indication of presence and availability, or not, of the de-multicaster, the controller is able determine whether or not it is possible to make the client benefit from the multicast-to-unicast conversion. It avoids that the controller attempts redirecting the client toward a de-multicaster that is not present or that is present but not available (e.g., active). It avoids that the controller has to check on its own whether the gateway or another device in the local area network embeds a de-multicaster and whether the de-multicaster, if any, is effectively active, which is time and resources consuming when the controller interacts with numerous gateways.

BRIEF DESCRIPTION OF THE DRAWINGS

The characteristics of the invention will emerge more clearly from a reading of the following description of at least one embodiment, said description being produced with reference to the accompanying drawings, among which.

DETAILED DESCRIPTION OF AT LEAST ONE EMBODIMENT

Figure 1:
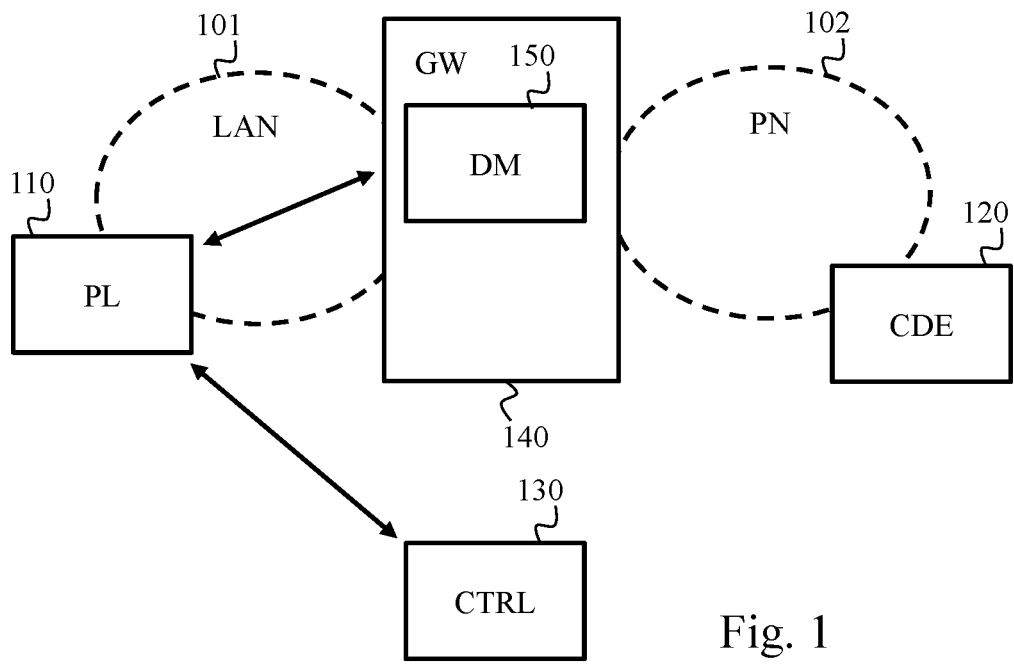
FIG. 1 schematically represents an AV live content delivery system according to the present invention.

FIG. 1 schematically represents an AV live content delivery system according to the present invention.

The AV live content delivery system comprises a gateway GW 140 interconnecting a LAN 101 and a provider network PN 102. The provider network PN 102 is for instance an ISP ("Internet Service Provider") network. The provider network PN 102 is for instance a cable or satellite broadcast network. The provider network PN 102 may therefore allow downlink and uplink transmissions, or only allow downlink transmissions, as detailed hereafter. In a preferred embodiment, the LAN 101 and the provider network PN 102 support the IP protocol. The gateway GW 140 is preferably a residential gateway.

The AV live content delivery system typically comprises plural LAN thus interconnected by respective gateways to the provider network PN 102, so as to allow client devices at different geographical locations to benefit from the AV live content delivery.

In the AV live content delivery system, at least one client includes a player PL 110 or is connected thereto. The client is typically connected to the LAN 101. The player PL 110 is adapted and configured to consume (e.g., play, record) AV live contents received by the client in unicast form. Preferably, the client is adapted and configured to communicate and to receive the AV live contents using HTTP, and for instance adapted and configured to consume AV live content conforming to HAS ("HTTP Adaptive Streaming") scheme. The client is thus not able to receive the AV live contents in multicast nor broadcast form. As detailed hereafter, the player PL 110 is agnostic to the AV live content delivery system's infrastructure. The client shapes received AV live content data intended to be consumed by the player PL 110 so that the AV live content data are in a form adequate to the player PL 110. The client performs protocol exchanges to enable the player PL 110 to receive said AV live content data. It is considered hereinafter for the shake of simplicity that the client and the player PL 110 are a single entity.

In the AV live content delivery system, a content delivery equipment CDE 120 is connected directly or indirectly to the provider network PN 102. The content delivery equipment CDE 120 comprises one or more servers. The content delivery equipment CDE 120 comprises at least a multi-caster. The multicaster is in charge of providing via the provider network PN 102 AV live contents in multicast form. For example, the multicaster provides various representations of the AV live contents in the form of multicast streams using RTP over UDP ("User Datagram Protocol", as defined by the normative document RFC 768). Relying on multicast transmissions via the provider network PN 102 allows downsizing back-end infrastructure (i.e., processing resources and bandwidth needed by the content delivery equipment CDE 120 for performing the AV live contents delivery) compared to a delivery of the AV live content in a unicast way.

Upstream the multicaster may be present an origin server, also referred to as origin packager, in charge of packaging the various representations of the AV live contents into segments, all aligned (same duration, same images) as a set of media files for instance conforming to HAS scheme. Upstream the origin packager may be present an OTT ("Over-The-Top") encoder delivering the various representations of the AV live content (e.g., TV channel) to the origin packager, each representation being encoded by the OTT encoder with a particular bit-rate/quality.

The gateway GW 140 or another device in the LAN 101 (including the client) comprises a de-multicaster DM 150. The de-multicaster DM 150 is adapted and configured to receive multicast IP packets transmitted by the multicaster, possibly by going through the gateway GW 140 when the de-multicaster DM 150 is located in another device in the LAN 101.

The de-multicaster DM 150 is adapted and configured to extract AV live content segments ready for feeding the player PL 110 by using unicast transmissions. When the player PL 110 receives an AV live content, the player PL 110 is adapted and configured to monitor bandwidth available for receiving the AV live content, and further to select the representation of the AV live content matching available bandwidth and preferably available internal processing resources. The de-multicaster DM 150 is therefore adapted and configured to perform multicast-to-unicast conversion. To do so, the de-multicaster DM 150 is adapted and configured to manage multicast stream registrations, for instance by implementing the IGMP ("Internet Group Management Protocol", as defined by the normative document RFC 3376) protocol. Furthermore, the de-multicaster DM 150 knows by prior configuration which AV live content might be received via multicast transmissions, for instance by using a predefined dedicated multicast stream or channel provided by the content delivery equipment CDE 120 or by exchanging with a predefined dedicated configuration server of the content delivery equipment CDE 120.

The de-multicaster DM 150 may be further adapted and configured to request, and receive in response, AV live contents segments in unicast form to a repair unicast server RUS of the content delivery equipment CDE 120, in order to enable the de-multicaster DM 150 to retrieve AV live content segments lost during the multicast transmissions. This aspect is addressed hereafter.

Gateways and LANs connected to the provider network PN 102, such as the gateway GW 140 and the LAN 101, may include such a de-multicaster, while other gateways or other LANs connected to the provider network PN 102 may not include such a de-multicaster. Moreover, among the gateways or LANs that include such a de-multicaster, some de-multicasters may be present but not be active, and some de-multicasters may already be running out of memory and/or processing resources. This aspect is addressed in details hereafter.

In the AV live content delivery system, a controller CTRL 130 orchestrates the AV live content delivery, i.e., manages routing of requests to get audio-visual live contents. Depending on the AV live content delivery system's infrastructure, the controller CTRL 130 may be located in the provider network PN 102, or connected thereto, or may be located in the gateway GW 140 or in the LAN 101. When the player PL 110 is expected to consume an AV live content (e.g., according to a user command), the player PL 110 contacts the controller CTRL 130 in order to request delivery of the AV live content in question. The player PL 110 contacts the controller CTRL 130 as if the controller CTRL 130 were a server from which the AV live content can be delivered. The fact that the controller CTRL 130 is not able to deliver the AV live content by itself is transparent to the player PL 110. The player PL 110 determines how to contact the controller CTRL 130 using DNS ("Domain Name System") resolution or using address deduction from a discovery procedure aiming at detecting availability of the de-multicaster DM 150 in the gateway GW 140 or in another device in the LAN 101. This aspect is addressed in details hereafter. In order to fulfil the request for delivering the AV live content, the controller CTRL 130 redirects the player PL 110 to an appropriate unicast server (e.g., of the content delivery equipment CDE 120) or to the de-multicaster DM 150, according to whatever is feasible in view of the AV live content delivery system's infrastructure and actual operational state in an objective to optimize resources consumption in provider network PN 102. In other terms, the controller decides how redirecting the client to fulfill requests to get targeted AV live contents, according at least to the indication of presence and availability, or not, of such a de-multicaster able to provide multicast-to-unicast conversion to the client. This aspect is also addressed in details hereafter.

In a particular embodiment, the de-multicaster DM 150 is installed in the gateway GW 140. In another particular embodiment, the de-multicaster DM 150 is installed in a set-top box connected to the gateway GW 140. Such a set-top box is in the LAN 101, and may further be connected to the gateway GW 140 via the LAN 101 or by a dedicated link.

In a particular embodiment, the client and the player PL 110 are installed in the gateway GW 140 or in a set-top box connected thereto. If the de-multicaster DM 150 is also present in the gateway GW 140 or in the set-top box connected thereto, the client and the player PL 110 are installed hermetically with respect to the de-multicaster DM 150 and, if present, from the controller CTRL 130. It means that prior to performing the discovery procedure, the client and the player PL 110 are not aware whether or not they are co-located in the same device as the de-multicaster DM 150.

Figure 2A:
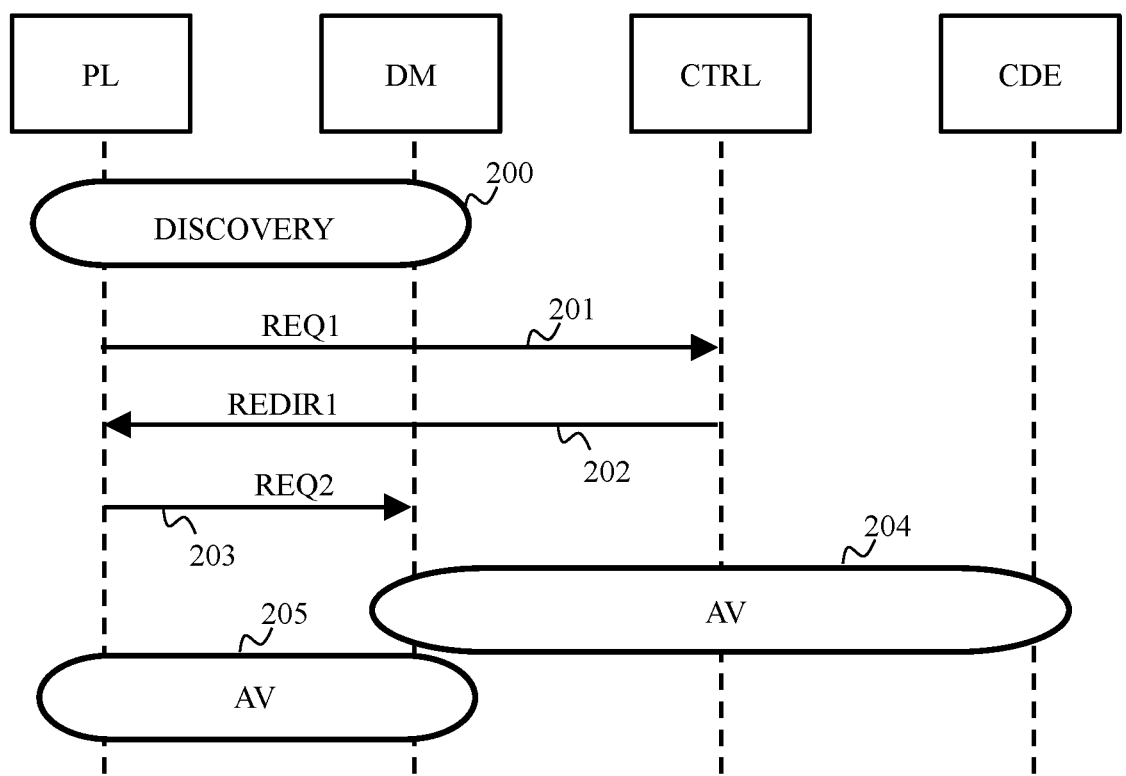
FIGS. 2A and 2B schematically represent exchanges occurring in the AV live content delivery system according to the present invention.
Figure 2B:
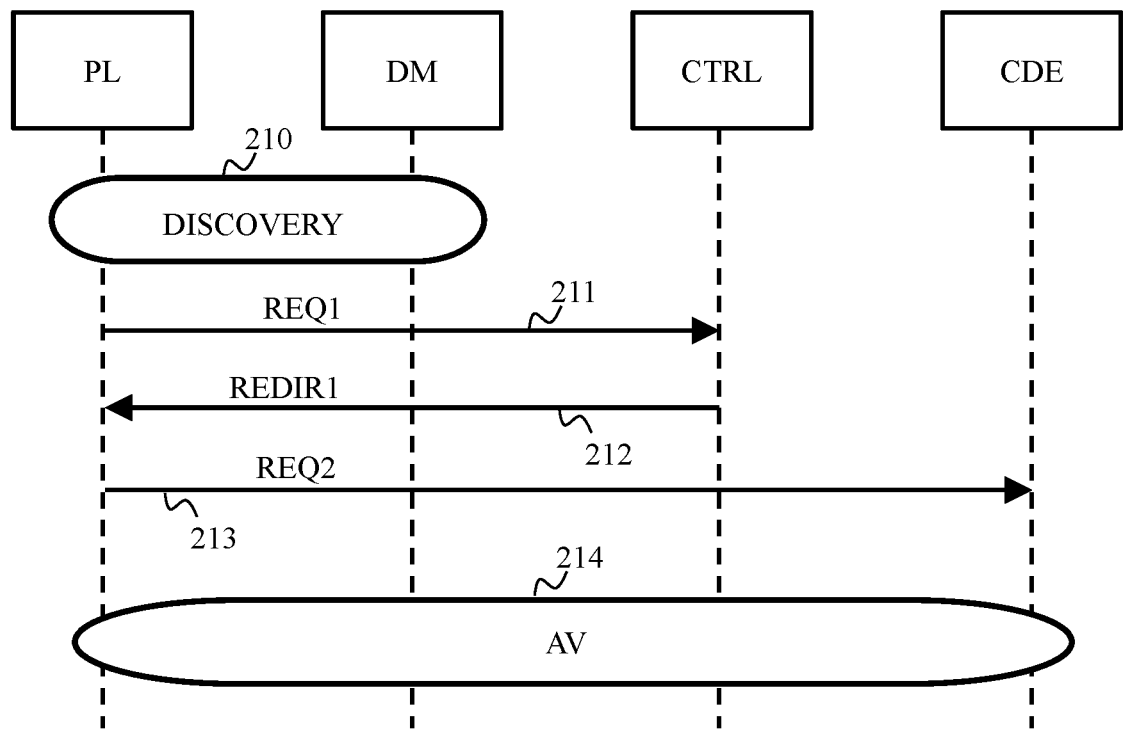

FIGS. 2A and 2B schematically represent exchanges occurring in the AV live content delivery system according to the present invention.

In a step 200 in FIG. 2A and in a step 210 in FIG. 2B, the player PL 110 initiates a discovery procedure during which the gateway GW 140 and any other device on the LAN 101 has to inform the player PL 110 whether or not said gateway GW 140 or said other device on the LAN 101 embeds an available de-multicaster. When the player PL 110 is embedded in a device distinct from the gateway GW 140, the discovery procedure is performed in the LAN 101. When the player PL 110 is hosted by a device able to embed such a de-multicaster (such as the gateway GW 140), the discovery procedure is further performed via an API ("Application Programming Interface") of the device hosting the player PL 110.

An available de-multicaster refers to as a de-multicaster that, firstly, is present and that, secondly, is active (i.e., running). An available de-multicaster may further refer to as a de-multicaster that has enough memory and/or processing resources to take in charge a supplementary AV live content for multicast-to-unicast conversion.

Let's illustratively consider hereinafter that the player PL 110 is embedded in a device distinct from the gateway GW 140 and that the discovery procedure is solely performed in the LAN 101. The discovery procedure principles described herein in the context of the LAN 101 would apply mutatis mutandis in the context of the aforementioned API.

The discovery procedure for instance uses an SDP ("Service Discovery Protocol") protocol, such as SSDP ("Simple Service Discovery Protocol") protocol as also used in UPnP ("Universal Plug n' Play", as defined by the normative document ISO/IEC 29341) protocol, or the technology Zeroconf, such as Apple's Bonjour or DNS-based service discovery approaches. A local DNS server located in the gateway GW 140 for instance and configured beforehand possibly by the de-multicaster DM 150, when present, allows resolution of a predefined domain name associated with said de-multicaster DM 150.

During the discovery procedure, the player PL 110 probes the LAN 101 in order to determine whether a de-multicaster is present in the gateway GW 140 or more generally on the LAN 101 and preferably whether the de-multicaster, if any, is active or not. If a device hosts such a de-multicaster, said device transmits in response a descriptor identifying the de-multicaster DM 150 in question. Considering that the gateway GW 140 embeds the de-multicaster DM 150, the gateway GW 140 thus transmits in response a descriptor identifying the de-multicaster DM 150. The descriptor thus inherently indicates presence of the de-multicaster DM 150. The descriptor further indicates an address for contacting the de-multicaster DM 150 and possibly a local name of the de-multicaster DM 150 which is defined by configuration when installing the de-multicaster DM 150.

It has to be noted that the term "address" used herein has to be understood in its broad meaning, including in particular a concatenation of an IP address and a port number.

The descriptor may further indicate whether the de-multicaster DM 150 is active. The descriptor may further indicate whether the de-multicaster DM 150 has enough memory and/or processing resources for accepting another AV live content delivery. In order to fill in the descriptor with such information, the device hosting the de-multicaster DM 150 may request internally the de-multicaster DM 150 to confirm being active, and possibly whether the de-multicaster DM 150 has enough memory and/or processing resources for accepting another AV live content delivery.

In a preferred alternative embodiment, the descriptor only indicates presence of the de-multicaster DM 150 and an address, such as an IP address and a port number, for contacting the de-multicaster DM 150. Then, the player PL 110 transmits a dedicated request to the de-multicaster DM 150 to determine whether the de-multicaster DM 150 is active or not, by using the address provided in the descriptor. When the de-multicaster DM 150 responds to said dedicated request, the player PL 110 concludes that the de-multicaster DM 150 is active. When responding, the de-multicaster DM 150 may indicate whether the de-multicaster DM 150 has enough memory and/or processing resources for accepting another AV live content delivery. If no response to the dedicated request is received within a predefined timeout delay, the player PL 110 concludes that the de-multicaster DM 150 is inactive.

In a step 201 in FIG. 2A and in a step 211 in FIG. 2B, the player PL 110 obtains an address for contacting the controller CTRL 130 and transmits to the controller CTRL 130 a request REQ1 requesting delivery of one particular AV live content. The request REQ1 is thus a unicast message that identifies the AV live content in question. For instance, the request REQ1 is an HTTP GET message including an URL ("Uniform Resource Locator") composed of an FQDN ("Fully Qualified Domain Name") followed by a path toward a text file with an appropriate file extension (in view of the format in which the AV live content is packaged), such as:

HTTP GET tv.myISP.com/SportsChannel1.mpd

The request REQ1 further includes information indicating, following the discovery, whether or not the gateway via which the player PL 110 accesses the provider network PN 102 embeds a de-multicaster able to take in charge AV live content delivery for the player PL 110. For instance, reusing the example above, the request REQ1 includes an inline parameter explicitly providing such information, as follows when indicating de-multicaster availability:

HTTP GET tv.myISP.com/SportsChannel1.mpd?de-multicaster=ON and as follows when indicating de-multicaster unavailability:

HTTP GET tv.myISP.com/SportsChannel1.mpd?de-multicaster=OFF

Another preferred approach is that the request REQ1 implicitly includes such information. The request REQ1 includes instead an inline parameter providing, if any, the address of the de-multicaster in question or its local name. When no address is specified, no de-multicaster is available, and the request REQ1 includes no such inline parameter, for instance as follows:

HTTP GET tv.myISP.com/SportsChannel1.mpd and otherwise, the request REQ1 includes the address or the local name of said de-multicaster as inline parameter, for instance as follows:

HTTP GET tv.myISP.com/SportsChannel1.mpd?
  de-multicaster=192.168.1.100:8000 wherein, in this example, 192.168.1.100:8000 is the combination of IP address and port number of the de-multicaster DM 150.

This preferred approach advantageously allows avoiding having only one well-established local name and/or address for all the de-multicasters deployed in the AV live content delivery system.

The request REQ1 may further include as an extra inline parameter, in case the de-multicaster is present, the FQDN information (tv.myISP.com in this example) as follows.

HTTP GET tv.myISP.com/SportsChannel1.mpd?
  de-multicaster=192.168.1.100:
8000&FQDN_orig=tv.myISP.com This is useful later on for the de-multicaster DM 150 for e.g. access control reason and for further aspect described hereafter in detailed embodiment. Note that this inline parameter is not mandatory. If not present, then it may be added by the controller CTRL 130 when redirecting the player PL 110 to the de-multicaster DM 150. If present, it is transparent to the controller CTRL 130, which only has to copy the inline parameters of the request REQ1 when needing to redirect the player PL 110 toward the de-multicaster DM 150.

It is considered in the step 201 in FIG. 2A that the request REQ1 includes information indicating that a de-multicaster able to take in charge AV live content delivery for the player PL 110 is locally present. It is complementarily considered in the step 211 in FIG. 2B that the request REQ1 includes information indicating that no de-multicaster able to take in charge AV live content delivery for the player PL 110 is locally present.

In a step 202 in FIG. 2A and in a step 212 in FIG. 2B, the controller CTRL 130 checks whether or not the AV live content in question is available in any form. When the controller CTRL 130 determines that the AV live content in question is not available in any form, the controller CTRL 130 rejects the request REQ1, for instance by returning an HTTP ERROR 404 message.

In the step 202 in FIG. 2A, the controller CTRL 130 checks whether or not the AV live content in question is available in multicast form. The controller CTRL 130 accesses for instance a file providing a list of AV live contents available in multicast form. When the controller CTRL 130 determines that the AV live content in question is available in multicast form, the controller CTRL 130 redirects the player PL 110 toward the de-multicaster DM 150, as depicted in FIG. 2A. To do so, the controller CTRL 130 preferably includes in a redirect message REDIR1 transmitted in response to the request REQ1 the address or the local name of the de-multicaster DM 150 as provided as inline parameter of the request REQ1.

In addition, when the provider network PN 102 allows uplink communications, the controller CTRL 130 may include in the redirect message REDIR1, as an inline parameter the address (or URL) of a unicast AV live content delivery server on the provider network PN 102 (e.g., of the content delivery equipment CDE 120). Such a unicast AV live content delivery server can be used later on by the de-multicaster DM 150 in order to complete AV live content segments received in multicast form by segments in unicast form, in particular when the de-multicaster DM 150 detects that there is at least one missing AV live content among the segments received in multicast form.

Continuing with the example above, the redirect message REDIR1 is thus for instance as follows:
  HTTP REDIRECT 192.168.1.100:8000/SportsChannel1.mpd?FQDN_orig=tv.myISP.com&CDN_unicastServer=<address of the server>

When the controller CTRL 130 determines that the AV live content in question is not available in multicast form, the controller CTRL 130 redirects the player PL 110 toward the unicast AV live content delivery server on the provider network PN 102 (e.g., of the content delivery equipment CDE 120), if the AV live content delivery system's infrastructure allows uplink communications from the gateway GW 140 and the LAN 101 to the content delivery equipment CDE 120 and if such a unicast AV live content delivery server exists in the provider network PN 102 (e.g., in the content delivery equipment CDE 120). The player PL 110 is thus redirected in the same way as if no de-multicaster is present in the gateway GW 140 or any other device in the LAN 101, as depicted in FIG. 2B.

When the controller CTRL 130 is not able to determine whether or not the AV live content in question is available in multicast form, the controller CTRL 130 lets the de-multicaster DM 150 perform such a check at its end. In this case, the controller CTRL 130 preferably indicates as inline parameter in the redirect message REDIR1 the address (or URL) of the unicast AV live content delivery server in question.

Each inline parameter of the redirect message REDIR1 is then provided by the player PL 110 to the de-multicaster DM 150 during redirection, thus allowing the de-multicaster DM 150 to identify the address of the unicast AV live content delivery server when needed. This aspect is addressed in FIGS. 9A and 9B in a context of a particular infrastructure embodiment shown in FIG. 8, but the same principle also applies in a context of a particular infrastructure embodiment shown in FIG. 4 (i.e., as far as the provider network PN 102 allows uplink communications).

In a particular embodiment, the redirect message REDIR1 redirecting the player PL 110 toward the de-multicaster DM 150 further includes other inline parameters, such as for instance an address of a repair unicast server, if any, and/or multicast addresses of the various representations of the AV live content in question if known by the controller CTRL 130. Continuing with the example above, the redirect message REDIR1 is for instance as follows:
  HTTP REDIRECT 192.168.1.100:8000/SportsChannel1.mpd?
  FQDN_orig=tv.myISP.com&CDN_unicastServer=<address of the server>
  &repair=172.16.254.1:80 wherein 172.16.254.1:80 is the combination of IP address and port number allocated to the repair unicast server in question.

Turning now to the step 212 in FIG. 2B, the controller CTRL 130 checks whether or not the AV live content in question is available in unicast form. The controller CTRL 130 accesses for instance a file providing a list of AV live contents available in unicast form. When the controller CTRL 130 determines that the AV live content in question is available in unicast form, the controller CTRL 130 redirects the player PL 110 toward the unicast AV live content delivery server on the provider network PN 102 (e.g., of the content delivery equipment CDE 120), if the AV live content delivery system's infrastructure allows uplink communications from the LAN 101 to the content delivery equipment CDE 120 and if such a unicast AV live content delivery server exists on the provider network PN 102 (e.g., in the content delivery equipment CDE 120). To do so, the controller CTRL 130 preferably includes in a redirect message REDIR1 transmitted in response to the request REQ1 an address of the unicast AV live content delivery server in question. Continuing with the example above, the redirect message REDIR1 is for instance as follows:
  HTTP REDIRECT 172.16.248.3:80/SportsChannel1.mpd
  wherein 172.16.248.3:80 is the combination of IP address and port number of the unicast AV live content delivery server in question.

Otherwise, the controller CTRL 130 rejects the request REQ1, for instance by returning an HTTP ERROR 404 message.

In a step 203 in FIG. 2A and in a step 213 in FIG. 2B, the player PL 110 transmits another request REQ2 according to the instructions contained in the redirect message REDIR1. The request REQ2 thus requests delivery of the AV live content in question from another server than the controller CTRL 130 initially solicited. In the step 203 in FIG. 2A, the player PL 110 transmits the request REQ2 to the de-multicaster DM 150.

In the step 213 in FIG. 2B, the player PL 110 transmits the request REQ2 to the unicast AV live content delivery server.

Consequently, the player PL 110 receives the AV live content in question. Either the AV live content is received, in a step 205 in FIG. 2A, in unicast form from the de-multicaster DM 150 acting as a relay of transmissions received from the content delivery equipment CDE 120 in a step 204; or the AV live content is received in unicast form from the unicast AV live content delivery server (e.g., content delivery equipment CDE 120), namely without passing via the de-multicaster DM 150, in a step 214 in FIG. 2B.

In the steps 204 and 205, when the provider network 102 allows uplink communications, requested AV live content segments are either present at the de-multicaster DM 150 as previously received in multicast form from the multicaster of the content delivery equipment CDE 120 and the de-multicaster DM 150 can return requested AV live content segments to the player PL 110 or, when segments are missing, the de-multicaster DM 150 can requests the content from the unicast AV live content delivery server.

Thanks to the approach described above, the controller CTRL 130 dynamically determines whether the gateway GW 140 or any other device in the LAN 101 implements such a de-multicaster and, if any, whether this de-multicaster is able to take in charge the player PL 110 for fulfilling an AV live content delivery request. Indeed, the de-multicaster may be present but inactive which means that redirecting the player PL 110 toward the de-multicaster would in this case be inadequate since it would at least imply a significant useless latency from the perspective of the QoE ("Quality of Experience") of the player PL 110.

The approach is flexible in terms of effective location of the controller CTRL 130, as detailed hereafter in particular infrastructure embodiments in FIGS. 4, 6, 8 and 10, and such effective location has no consequence on the player PL 110 (i.e., client) implementation. Furthermore, the approach is flexible enough for supporting provider networks with no uplink communication capability from the gateway GW 140 and the LAN 101 through said provider networks (e.g., broadcast network), as well as provider networks with such uplink communication capability. It can further be noticed that the approach is adequate to adaptive streaming, thus allowing users to benefit from availability of different alternate versions (or representations) of the AV live content encoded at various respective bit rates (or resolutions).

Figure 3:
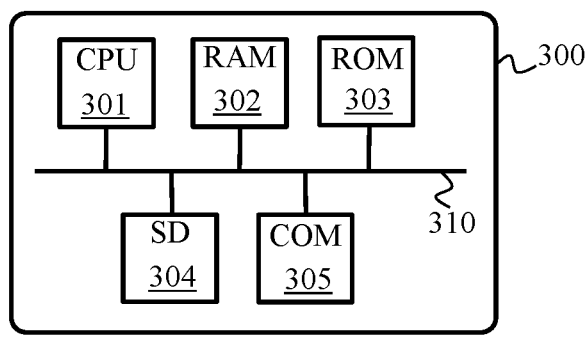
FIG. 3 schematically represents an exemplary hardware architecture of devices in the AV live content delivery system.

FIG. 3 schematically represents an exemplary hardware architecture of devices of the AV live content delivery system. The de-multicaster DM 150 and/or the controller CTRL 130 and/or the gateway GW 140 and/or the player PL 110 and/or any server of the content delivery equipment CDE 120 may be built around such exemplary hardware architecture. Let's illustratively consider that FIG. 3 represents the hardware architecture of the controller CTRL 130.

According to the shown exemplary hardware architecture, the controller CTRL 130 comprises the following components interconnected by a communications bus 310: a processor, microprocessor, microcontroller or CPU ("Central Processing Unit") 301; a RAM ("Random-Access Memory") 302; a ROM ("Read-Only Memory") 303 or EEPROM ("Electrically Erasable ROM") or Flash memory; a hard-disk drive, or any other device adapted to read information stored on a non-transitory storage medium, such as an SD ("Secure Digital") card reader 304; at least one communication interface COM 305 allowing to communicate via the LAN 101 and/or the provider network PN 102.

The CPU 301 is capable of executing instructions loaded into the RAM 302 from the ROM 303 or from an external memory, such as an SD card. After the controller CTRL 130 has been powered on, the CPU 301 is capable of reading instructions from the RAM 302 and executing these instructions. The instructions form one computer program that causes the CPU 301 to perform the steps described herein with respect to the controller CTRL 130.

It should be noted that the steps described herein may be implemented in software form by execution of a set of instructions or program by a programmable computing machine, such as a PC ("Personal Computer"), a DSP ("Digital Signal Processor") or a microcontroller; or else implemented in hardware form by a machine or a dedicated component, such as an FPGA ("Field-Programmable Gate Array") or an ASIC ("Application-Specific Integrated Circuit"). More generally, any device of the AV live content delivery system comprises processing electronics circuitry adapted and configured for implementing the relevant steps as described herein with respect to the device in question.

Figure 4:
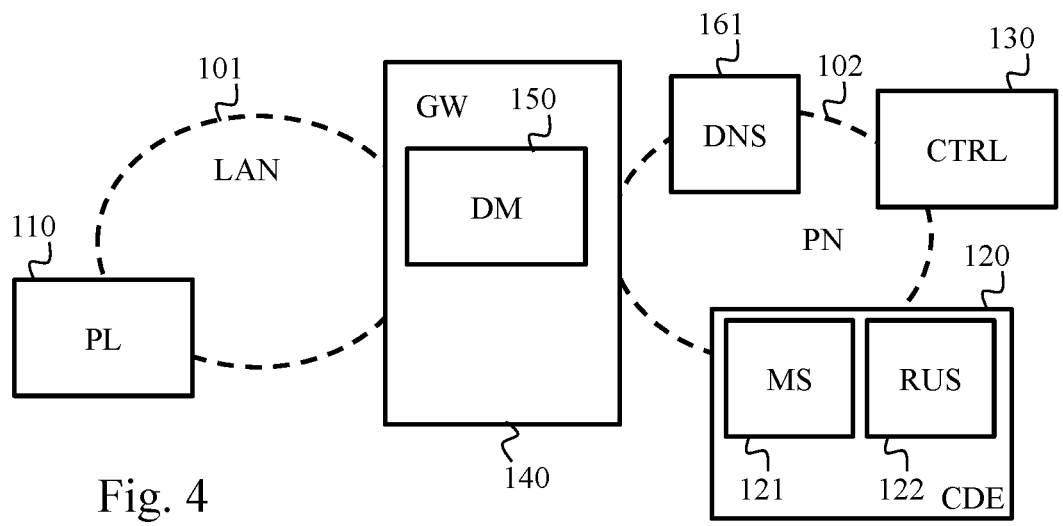
FIG. 4 schematically represents a first embodiment of the AV live content delivery system.

FIG. 4 schematically represents a first embodiment of the AV live content delivery system, wherein the controller CTRL 130 is located in the provider network PN 102 or connected thereto, namely beyond the gateway GW 140 from the standpoint of the player PL 110. In FIG. 4 further appears a DNS server 161 in the provider network PN 102 for resolving domain names. Moreover, the content delivery equipment CDE 120 in FIG. 4 shows the multicaster, or multicast server MS 121, as well as the aforementioned repair unicast server RUS 122. The repair unicast server RUS 122 may be co-located with the multicast server MS 121, i.e., physically located on the same machine. The repair unicast server RUS 122 implements a mechanism for recovering missing AV live content segments, typically through a standardized communication protocol selected depending on the transport protocol used for the multicast operations (e.g., RTP or FLUTE/ALC). The content delivery equipment CDE 120 may comprise other servers, as already evoked.

According to a particular feature, the repair unicast server RUS 122 obtains the segments of the AV live content by joining the various multicast streams supplied by the multicast server MS 121 for the respective various representations of the AV live content in question. The repair unicast server RUS 122 memorizes during a predefined lifetime packets of said multicast streams and serves repair requests from the de-multicaster DM 150 in order to compensate potential segment losses. For instance, the repair unicast server RUS 122 provides repairing service by relying on RTP retry (as defined in the normative document RFC 4588) on the basis of a continuity counter in RTP packets transmitted by the multicast server MS 121 which allows easy data loss detection.

In FIG. 4, the de-multicaster DM 150 is embedded in the gateway GW 140. As already mentioned, the de-multicaster DM 150 may in a variant indifferently be embedded in another device in the LAN 101.

Figure 5A:
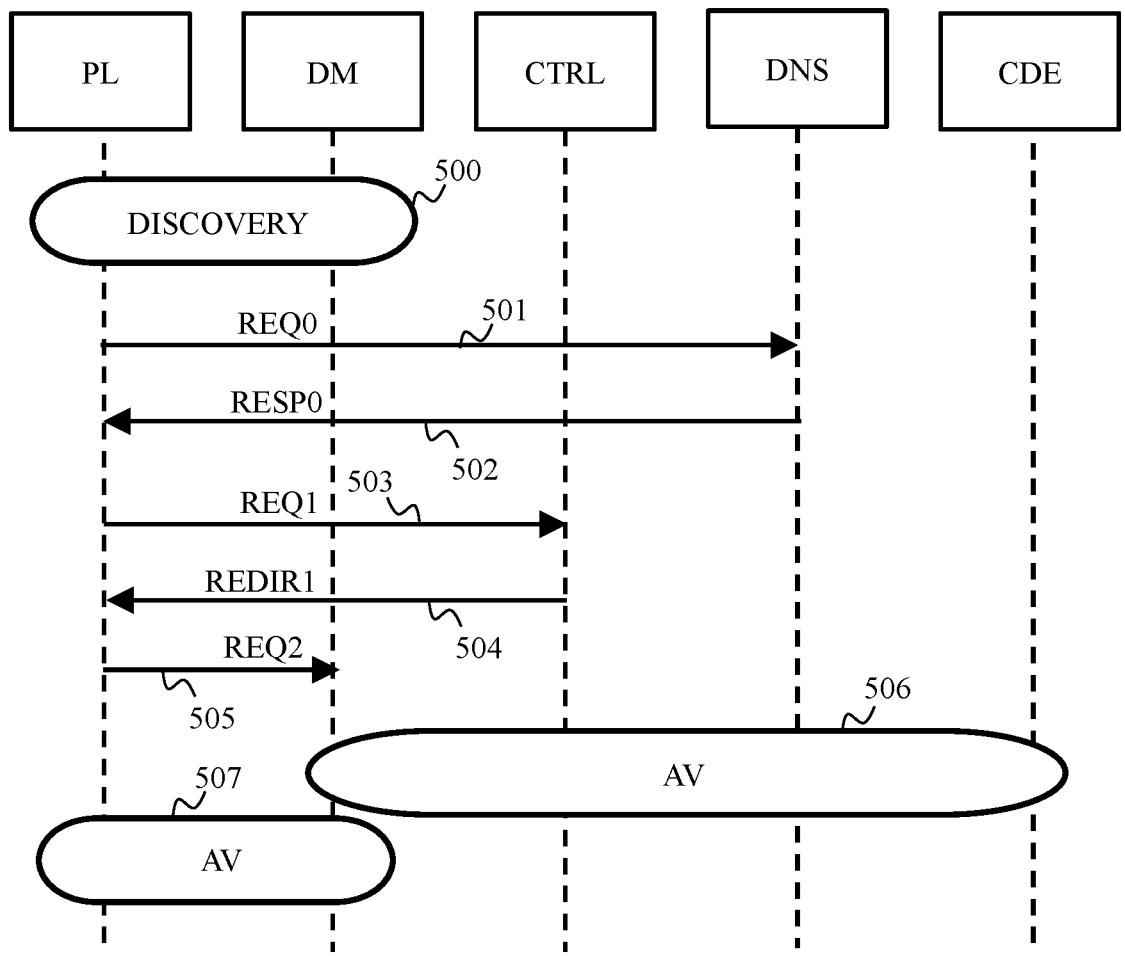
FIGS. 5A and 5B schematically represent exchanges occurring in the first embodiment of the AV live content delivery system.
Figure 5B:
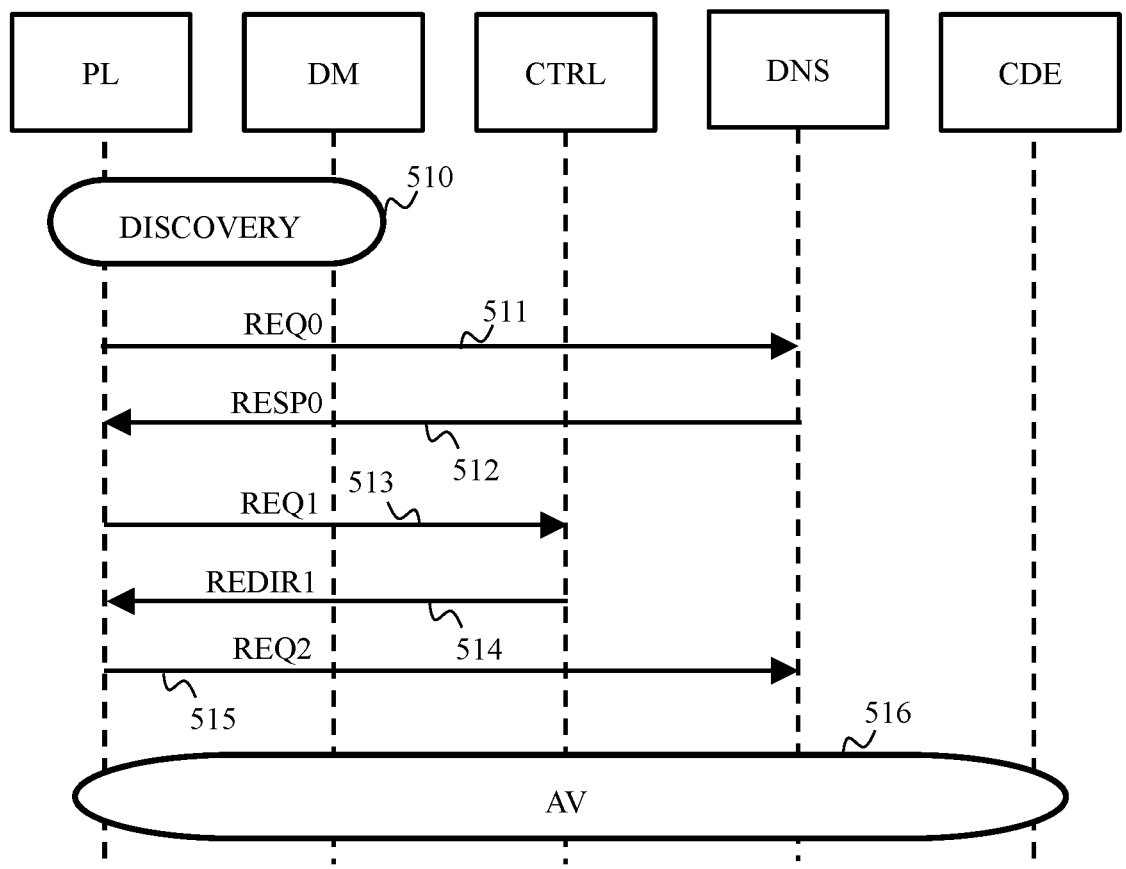

FIGS. 5A and 5B schematically represent exchanges occurring in the first embodiment of the AV live content delivery system shown in FIG. 4.

In a step 500 in FIG. 5A and in a step 510 in FIG. 5B, the player PL 110 performs the discovery procedure in the LAN 101 (and/or through API), as already described with respect to the step 200 in FIG. 2A and the step 210 in FIG. 2B.

For obtaining the address for contacting the controller CTRL 130, the player PL 110 requests domain name resolution to the DNS server 161. The address for contacting the DNS server 161 has been configured by the gateway GW 140 in the player PL 110 when the player PL 110 has been successfully registered in the LAN 101 managed by the gateway GW 140. The address for contacting the DNS server 161 may alternatively have been configured manually by a user when installing the player PL 110. Thus, in a step 501 in FIG. 5A and in a step 511 in FIG. 5B, the player PL 110 transmits a request REQ0 to the DNS server 161. The request REQ0 requests resolution of the FQDN of the URL identifying the AV live content targeted by the player PL 110, namely tv.myISP.com in the example above. The DNS server 161 performs the domain name resolution and thus retrieves the address of the controller CTRL 130 in the provider network PN 102. For instance, the domain name resolution leads to the following IP address: 72.68.18.14.

In a step 502 in FIG. 5A and in a step 512 in FIG. 5B, the DNS server 161 returns to the player PL 110 the retrieved address of the controller CTRL 130 in a response message RESP0. The player PL 110 is thus able to contact the controller CTRL 130.

In FIG. 5A, steps 503 to 507 performed afterwards are respectively identical to the steps 201 to 205 in FIG. 2A already detailed. And in FIG. 5B, steps 513 to 516 performed afterwards are respectively identical to the steps 211 to 214 in FIG. 2B already detailed.

When considering the step 506 in FIG. 5A in which the de-multicaster DM 150 obtains the segments of the AV live content from the content delivery equipment CDE 120, the de-multicaster DM 150 exploits the multicast stream that is supplied by the multicast server MS 121 and that corresponds to the AV live content's representation requested by the player PL 110. When the de-multicaster DM 150 faces segment loss, the de-multicaster DM 150 requests in unicast form the lost segment in question from the repair unicast server RUS 122, in order to continuously feed the player PL 110 with the AV live content segments thus improving QoE despite potential segment losses in the received multicast streams. Benefiting from such repairing is possible in the first embodiment of the AV live content delivery system shown in FIG. 4 since the provider network PN 102 structurally allows uplink communications from the gateway GW 140 and the LAN 101 to the content delivery equipment CDE 120. Relying on the repair server RUS 122 is particularly useful when there are losses of multicast packets, which are typically transmitted using a transport protocol (such as UDP) having no retransmission mechanism. When segment losses are due to missing segments among successive correctly received multicast packets, then the de-multicaster DM 150 may request the missing segments from a unicast AV live content delivery server.

Figure 6:
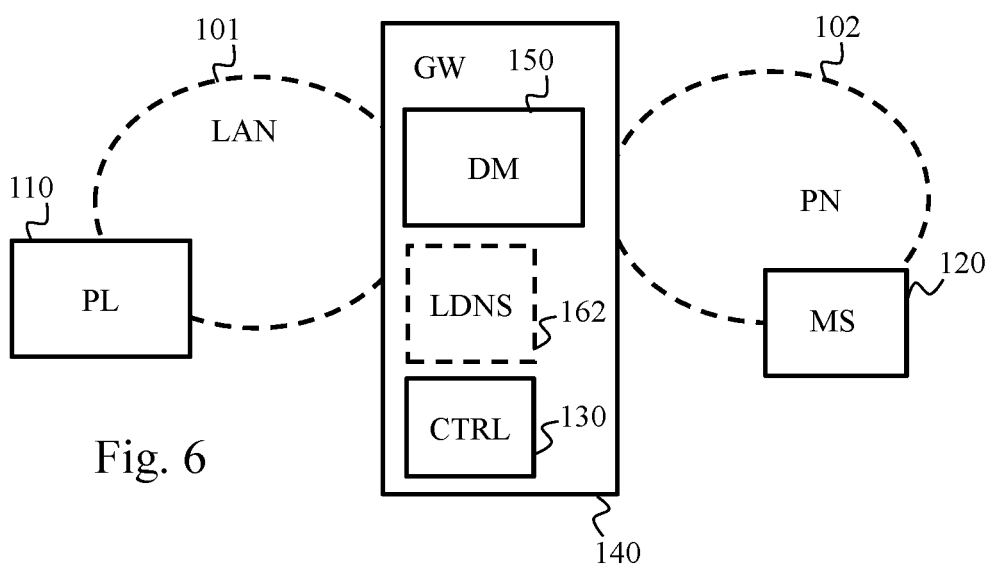
FIG. 6 schematically represents a second embodiment of the AV live content delivery system.

FIG. 6 schematically represents a second embodiment of the AV live content delivery system, wherein the controller CTRL 130 is also located in the gateway GW 140 or in another device in the LAN 101. In FIG. 6, the de-multicaster DM 150 is embedded in the gateway GW 140. As already mentioned, the de-multicaster DM 150 may in a variant indifferently be embedded in another device in the LAN 101. Moreover in FIG. 6, the controller CTRL 130 is co-located with the de-multicaster DM 150, namely in the gateway GW 140. The controller CTRL 130 may in a variant indifferently be embedded in another device in the LAN 101.

Further appears in FIG. 6 a local DNS (LDNS) server 162 for resolving domain names. The LDNS server 162 is located in the gateway GW 140 in FIG. 6, but may be located in another device in the LAN 101. The provider network PN 102 is a broadcast type of network and thus no uplink communications from the LAN 101 nor from the gateway GW 140 can be made toward the content delivery equipment CDE. Therefore servers in the content delivery equipment CDE accessible by the gateway GW 140 and any other device in the LAN 101 can only be multicast server such as multicast server MS 121 and only for downlink communications. It has to be noted that in such a context broadcast provider network servers are herein considered as multicast servers since each de-multicaster selects which AV content live stream (e.g., TV channel) to effectively receive and process, which thus refers to multicast transmissions (since broadcast transmissions would lead to all de-multicasters receiving the same data).

Figure 7:
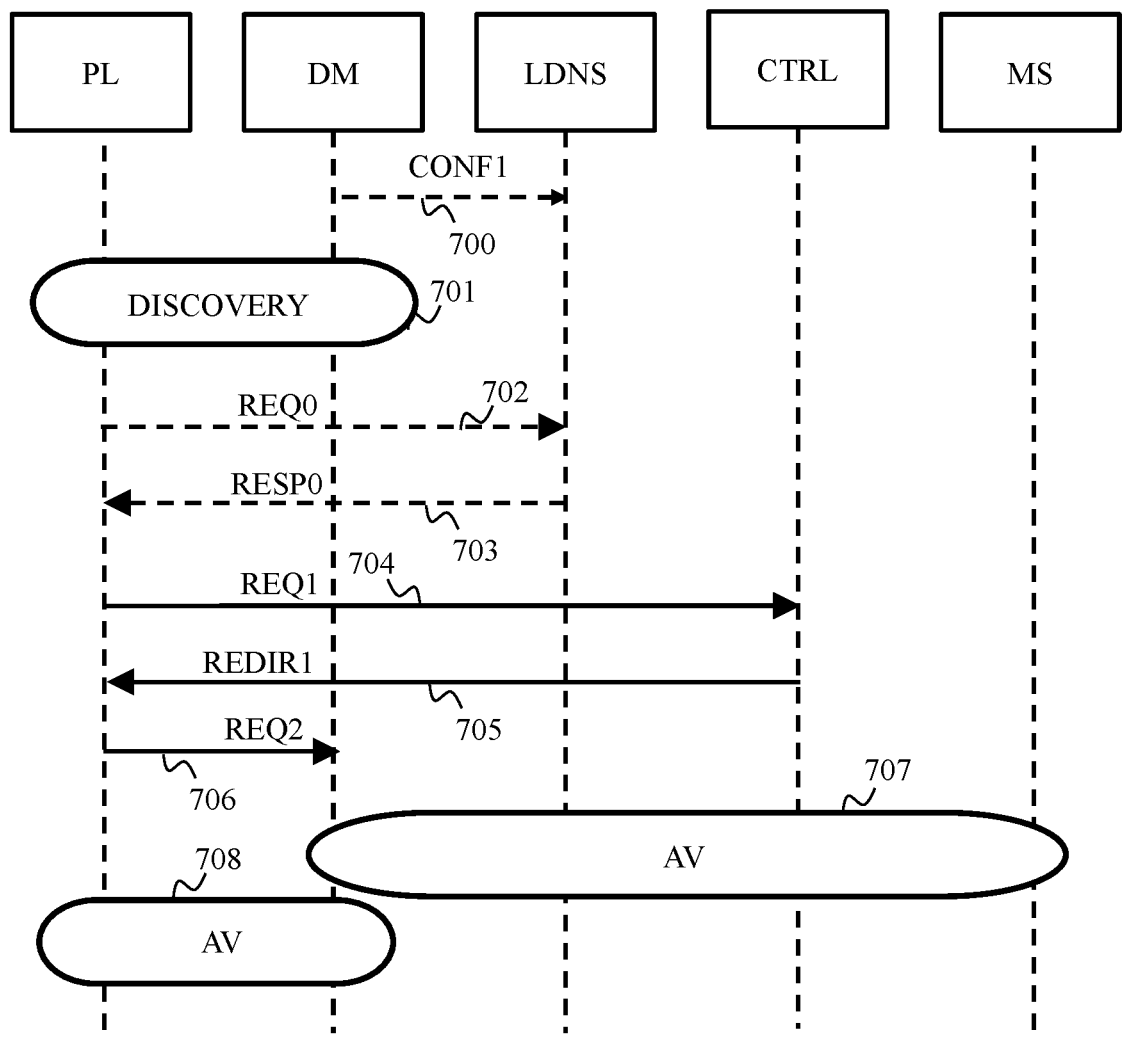
FIG. 7 schematically represents exchanges occurring in the second embodiment of the AV live content delivery system.

FIG. 7 schematically represents exchanges occurring in the second embodiment of the AV live content delivery system shown in FIG. 6.

In a step 701, the player PL 110 performs the discovery procedure in the LAN 101 (and/or through API), as already described with respect to the step 200 in FIG. 2A.

For obtaining the address for contacting the controller CTRL 130, the player PL 110 requests domain name resolution to the LDNS server 162. The address for contacting the LDNS server 162 has been configured by the gateway GW 140 in the player PL 110 when the player PL 110 has been successfully registered in the LAN 101 managed by the gateway GW 140. The address for contacting the LDNS server 162 may alternatively have been configured manually by a user when installing the player PL 110, especially when the LDNS server 162 is located in another device in the LAN 101. Thus, in a step 702, the player PL 110 transmits the request REQ0 to the LDNS server 162. The request REQ0 requests resolution of the FQDN of the URL identifying the AV live content targeted by the player PL 110, namely tv.myISP.com in the example above. The LDNS server 162 performs the domain name resolution and thus retrieves the address of the controller CTRL 130. For instance, the domain name resolution leads to the following IP address and port number: 192.168.1.100:8001.

Configuring the LDNS server 162 so that the LDNS server 162 is able to perform the domain name resolution and retrieve the address of the controller CTRL 130 is preferably performed by the de-multicaster DM 150 when the de-multicaster DM 150 has been successfully installed in the gateway GW 140, by transmitting to the LDNS server 162, in a step 700, a configuration message CONF1 providing an association between the FQDN of the URL of the AV live content in question and the address for contacting the controller CTRL 130. Such a message is thus internal to the gateway GW 140 when the de-multicaster DM 150 is hosted by the gateway GW 140. Alternatively the LDNS server 162 may be configured by any other means including manually by a user when installing the de-multicaster DM 150 and the controller CTRL 130.

In a particular embodiment where the de-multicaster DM 150 and the controller CTRL 130 are co-located in the same machine (e.g., the gateway GW 140), the domain name resolution performed by the LDNS server 162 may lead to a different IP address than the one used for contacting the de-multicaster DM 150, which is referred to as IP aliasing. This is particularly useful to ease conflict resolutions in port number allocations with other components of the gateway GW 140.

In a step 703, the LDNS server 162 returns to the player PL 110 the retrieved address of the controller CTRL 130 in the response message RESP0. The player PL 110 is thus able to contact the controller CTRL 130.

According to a particular variant feature where the de-multicaster DM 150 and the controller CTRL 130 are co-located in the same machine (e.g., the gateway GW 140), the player PL 110 determines the address for contacting the controller CTRL 130 without relying on domain name resolution. This situation might occur when there is no local DNS server in the LAN 101, or when the controller CTRL 130 is not allowed to configure such a local DNS server. The player PL 110 is, according to this particular variant feature, aware by configuration that the controller CTRL 130 is co-located with the de-multicaster DM 150 in the same machine (e.g., in the gateway GW 140). Thus, after having obtained the address of the de-multicaster DM 150 in the discovery procedure, the controller CTRL 130 derives the address of the controller CTRL 130 from the address of the de-multicaster DM 150 by applying a predefined substitution rule on a port number allocated to the de-multicaster DM 150. For instance, the controller CTRL 130 increments by one unit the port number of the address of the de-multicaster DM 150 in order to obtain the port number of the address of the controller CTRL 130.

In FIG. 7, steps 704 to 708 performed afterwards are respectively identical to the steps 201 to 205 in FIG. 2A already detailed. It has to be noted here that, contrary to FIG. 5A, the de-multicaster DM 150 cannot benefit here from any unicast server in the step 707 since it is not possible to perform uplink communications in the context of the second embodiment of the AV live content delivery system in FIG. 6.

Figure 8:
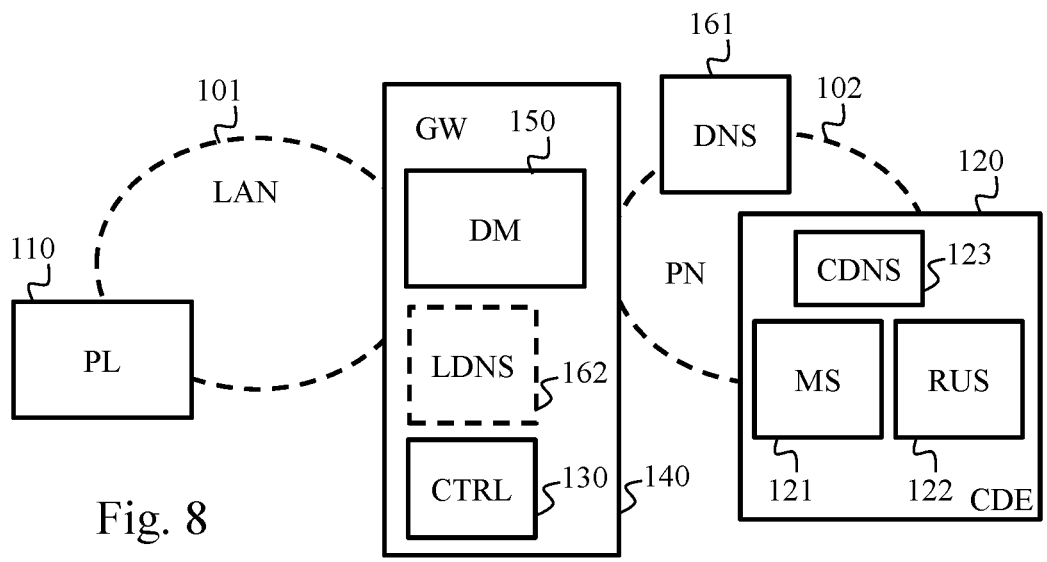
FIG. 8 schematically represents a third embodiment of the AV live content delivery system.

FIG. 8 schematically represents a third embodiment of the AV live content delivery system, which is an hybrid combination of the first and second embodiments described above with respect to FIGS. 4 and 6. In FIG. 8, the controller CTRL 130 is also located in the gateway GW 140 or in another device in the LAN 101. In FIG. 8, the de-multicaster DM 150 is embedded in the gateway GW 140. As already mentioned, the de-multicaster DM 150 may in a variant indifferently be embedded in another device in the LAN 101. Moreover in FIG. 8, the controller CTRL 130 is co-located with the de-multicaster DM 150, namely in the gateway GW 140. The controller CTRL 130 may in a variant indifferently be embedded in another device in the LAN 101. However, in FIG. 8, the provider network PN 102 allows uplink communications as in the first embodiment in FIG. 4. Thus, the content delivery equipment CDE 120 in FIG. 6 shows the multicaster, or multicast server MS 121, as well as the repair unicast server RUS 122.

The content delivery equipment CDE 120 in FIG. 6 further comprises a Content Delivery Network server CDNS 123. The server CDNS 123 is not aware of the multicast ability of the content delivery equipment CDE 120, and is for instance a third-party server via which AV live content can be requested in unicast form. The server CDNS 123 may be in a different authority domain than the content delivery equipment CDE 120 and may thus be separated from the content delivery equipment CDE 120. One should note that, when contacted for AV live content delivery, the server CDNS 123 may perform redirection toward another server in the provider network PN 102 for effective AV live content delivery. Further appear in FIG. 8 the DNS server 161 and the LDNS server 162 already shown respectively in FIGS. 4 and 6. The LDNS server 162 is located in the gateway GW 140 in FIG. 8, but may be located in another device in the LAN 101.

Figure 9A:
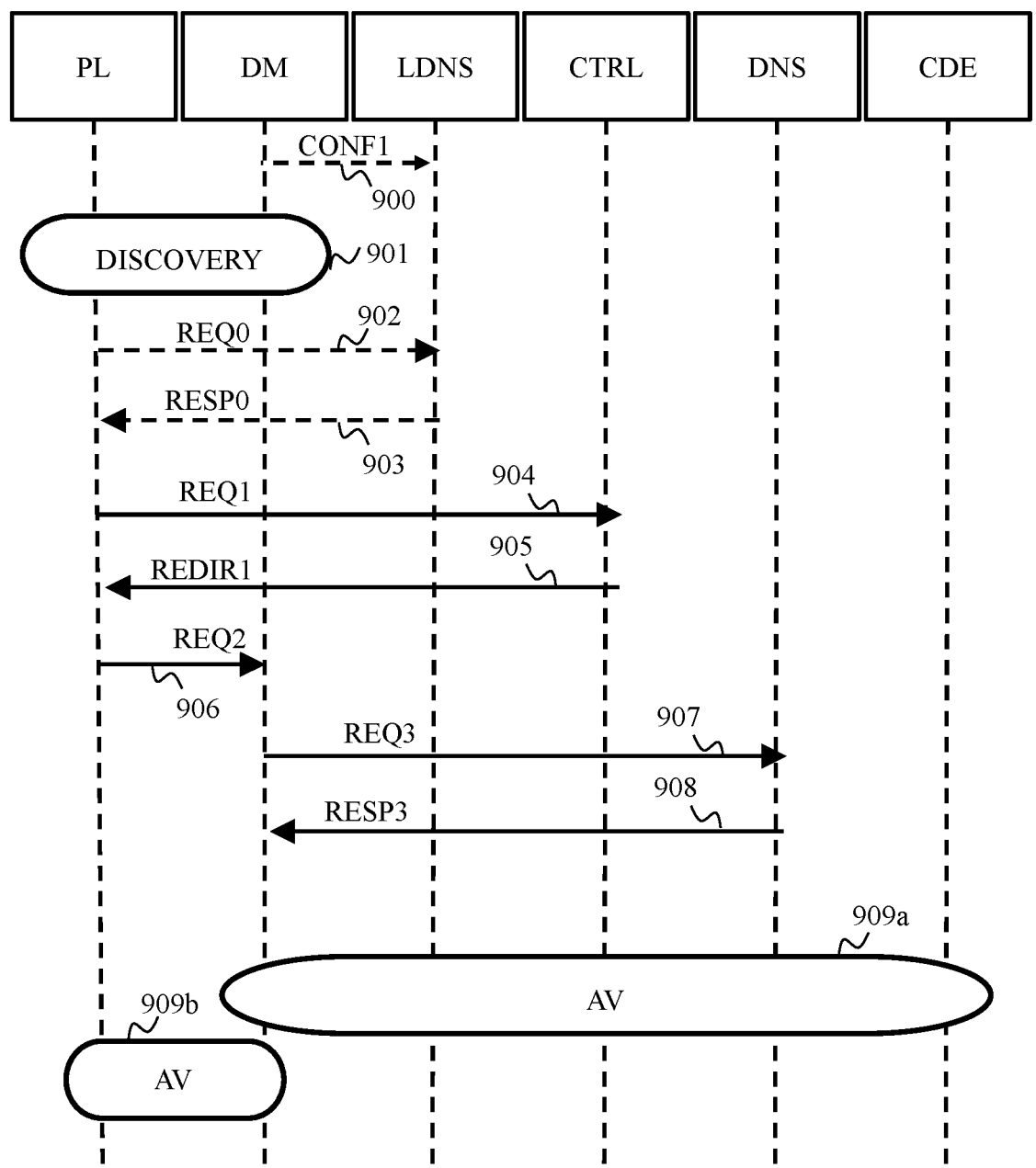
FIGS. 9A and 9B schematically represent exchanges occurring in the third embodiment of the AV live content delivery system.
Figure 9B:
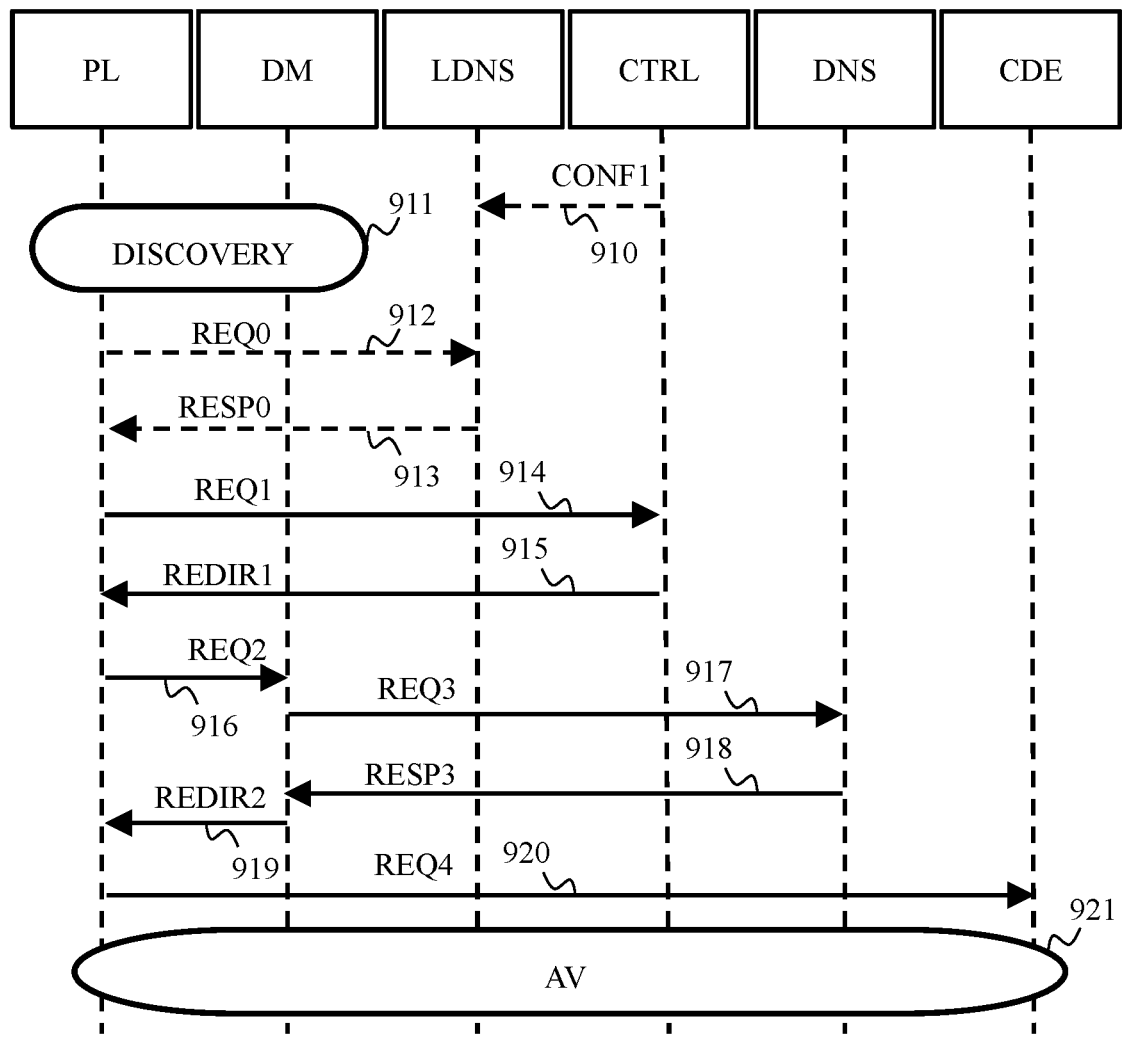

FIGS. 9A and 9B schematically represent exchanges occurring in the third embodiment of the AV live content delivery system shown in FIG. 8.

The LDNS server 162 is configured as already described with respect to FIG. 7. The de-multicaster DM 150 may thus preferably configure the LDNS server 162, in a step 900 via the configuration message CONF1, in order to enable the player PL 110 to obtain the address for contacting the controller CTRL 130 by domain name resolution. As described with respect to FIG. 7, a variant consists for the player PL 110 in deriving the address (port number) of the controller CTRL 130 from the address (port number) of the de-multicaster DM 150 obtained during the discovery procedure when the controller CTRL 130 and the de-multicaster DM 150 are co-located in the same machine.

In a step 901 in FIG. 9A and in a step 911 in FIG. 9B, the player PL 110 performs the discovery procedure in the LAN 101 (and/or through API), as already described with respect to the step 200 in FIG. 2A and the step 210 in FIG. 2B.

In a step 902 in FIG. 9A and in a step 912 in FIG. 9B, the player PL 110 transmits the request REQ0 to the LDNS server 162. The request REQ0 requests resolution of the FQDN of the URL identifying the AV live content targeted by the player PL 110, namely tv.myISP.com in the example above. The LDNS server 162 performs the domain name resolution and thus retrieves the address of the controller CTRL 130. For instance, the domain name resolution leads to the following IP address and port number: 192.168.1.100: 8001.

In a step 903 in FIG. 9A and in a step 913 in FIG. 9B, the LDNS server 162 returns to the player PL 110 the retrieved address of the controller CTRL 130 in the response message RESP0. The player PL 110 is thus able to contact the controller CTRL 130.

In FIG. 9A, steps 904 to 906 performed afterwards are respectively identical to the steps 201 to 203 in FIG. 2A already detailed.

In FIG. 9A, steps 909*a* and 909*b* performed afterwards are respectively identical to the steps 204 and 205 in FIG. 2A already detailed. It has to be noted here that, contrary to FIG. 7, the de-multicaster DM 150 can here benefit from the repair unicast server RUS 122 and/or from the server CDNS 123 in the step 909*b* since it is possible to perform uplink communications in the context of the third embodiment of the AV live content delivery system in FIG. 8. In order for the de-multicaster DM 150 to be able to benefit from the server CDNS 123, the controller CTRL 130 includes in the redirect message REDIR1 an inline parameter providing the FQDN of the URL identifying the AV live content targeted by the player PL 110 as indicated in the request REQ1, namely tv.myISP.com in the example above. Continuing with the example above, the redirect message REDIR1 is for instance as follows:

HTTP REDIRECT 192.168.1.100:8000/ SportsChannel1.mpd?FQDN_orig= tv.myISP.com&CDN_unicastServer=tv.myISP.com This is particularly useful when the server CDNS 123 is managed by a third-party compared with the controller CTRL 130 and the de-multicaster DM 150. The de-multicaster DM 150, receiving the request REQ2 in the step 906 may use services of a DNS client agent installed in the same machine as the de-multicaster DM 150 and in conjunction with said de-multicaster DM 150 so as to force domain name resolution by the DNS server 161 and avoid that the LDNS server 162, if any, be targeted by the domain name resolution.

From the inline parameter providing said FQDN as indicated in the request REQ1, the de-multicaster DM 150 request domain name resolution and a message REQ3 is transmitted accordingly in a step 907. The DNS server 161 processes the request REQ3, performs the domain name resolution and thus retrieves the address of the server CDNS 123. For instance, the domain name resolution leads to the following IP address: 72.36.53.18. Then, in a step 908, the DNS server 161 returns to the de-multicaster DM 150 the retrieved address of the server CDNS 123 in a response message RESP3. The de-multicaster DM 150 is thus able to operate that address for contacting the server CDNS 123 when needed (e.g., for obtaining missing AV live content segments).

In FIG. 9B, a step 914 performed afterwards is identical to the step 211 in FIG. 2B already detailed. It is considered here that the controller CTRL 130 has no information indicating whether the AV live content requested by the player PL 110 is available in multicast form. Even though when co-located in the same machine (e.g., in the gateway GW 140), the controller CTRL 130 and the de-multicaster DM 150 are not aware of the presence of each other. It would be possible to make them interact, but maintaining hermeticity between them simplifies development of the controller CTRL 130 since said controller CTRL 130 does not act differently when located in the gateway GW 140 or in the provider network PN 102. The controller CTRL 130 then let the de-multicaster DM 150 check whether the AV live content requested by the player PL 110 is available in multicast form. If the AV live content requested by the player PL 110 is available in multicast form, the exchange continues as depicted in FIG. 9A. Otherwise, the de-multicaster DM 150 needs to redirect the player PL 110 toward the server CDNS 123.

In order to redirect the player PL 110 toward the server CDNS 123, the de-multicaster DM 150 needs to request resolution of the FQDN of the URL identifying the AV live content targeted by the player PL 110. Indeed, the preceding domain name resolution directed the player PL 110 toward the controller CTRL 130, which would be inconvenient in the present situation as it would lead to an infinite loop. Thus, in a step 917, the de-multicaster DM 150 transmits a request REQ3 to the DNS server 161. The request REQ3 requests resolution of the FQDN of the URL identifying the AV live content targeted by the player PL 110, namely tv.myISP.com in the example above, which would need to have been provided by the controller CTRL 130 as inline parameter of the redirect message REDIR1 in the step 915. The de-multicaster DM 150 may use services of a DNS client agent installed in the same machine as the de-multicaster DM 150 and in conjunction with said de-multicaster DM 150 so as to force resolution by the DNS server 161 and avoid that the LDNS server 162, if any, be targeted by the domain name resolution.

The DNS server 161 performs the domain name resolution and thus retrieves the address of the server CDNS 123. For instance, the domain name resolution leads to the following IP address: 72.36.53.18. Then, in a step 918, the DNS server 161 returns to the de-multicaster DM 150 the retrieved address of the server CDNS 123 in a response message RESP3. The de-multicaster DM 150 is thus able to provide the address of the server CDNS 123 to the player PL 110.

In a step 919, the de-multicaster DM 150 transmits a redirect message REDIR2 to the player PL 110 in response to the request REQ2. The redirect message REDIR2 includes the address of the server CDNS 123 instead of the corresponding FQDN. Continuing with the example above, the redirect message REDIR2 is for instance as follows:

HTTP REDIRECT 72.36.53.18:80/SportsChannel1.mpd wherein the IP address of the server CDNS 123 is followed here by a default port number ('80').

In a step 920, the player PL 110 transmits another request REQ4 according to the instructions contained in the redirect message REDIR2. The request REQ4 thus requests delivery of the AV live content in question from the server CDNS 123. In a step 921, the player PL 110 receives the AV live content in unicast form from the server CDNS 123 (i.e., without passing via the de-multicaster DM 150).

Figure 10:
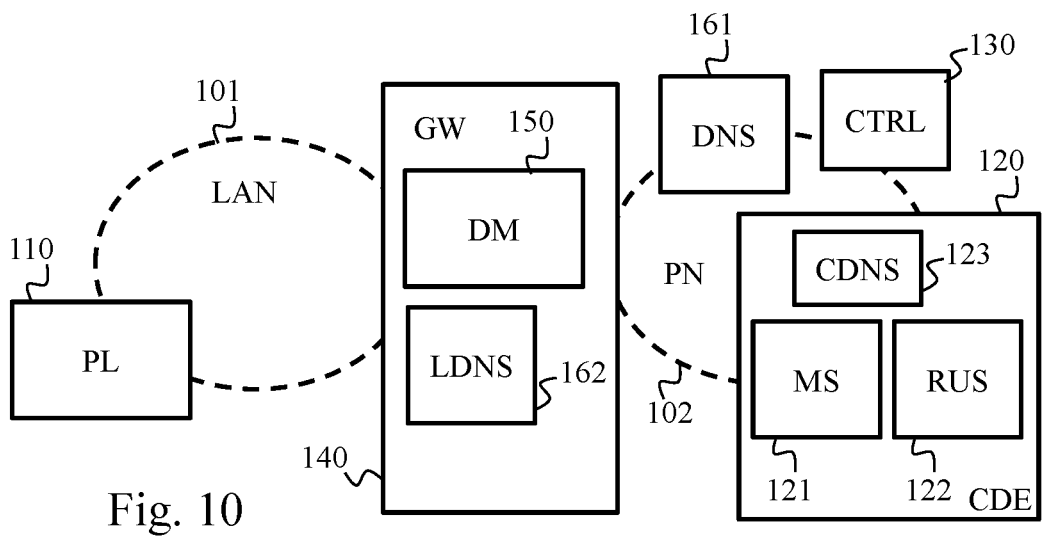
FIG. 10 schematically represents a fourth embodiment of the AV live content delivery system.

FIG. 10 schematically represents a fourth embodiment of the AV live content delivery system, which is derived from the third embodiment described above with respect to FIG. 8. In FIG. 10, the de-multicaster DM 150 is embedded in the gateway GW 140. As already mentioned, the de-multicaster DM 150 may in a variant indifferently be embedded in another device in the LAN 101. In FIG. 10, the controller CTRL 130 is located in the provider network PN 102 or connected thereto, namely beyond the gateway GW 140 from the standpoint of the player PL 110. In FIG. 10, the LDNS server 162 is present in the gateway GW 140, but may be located in another device in the LAN 101.

An issue raised by such a configuration lies in domain name resolution, in particular when the AV live content is not available in multicast form. When the AV live content targeted by the player PL 110 is available in multicast form, the exchanges run as already described with respect to FIG. 9A, except that the controller CTRL 130 is located beyond the gateway GW 140 from the standpoint of the player PL 110. Thus, for simplicity considerations, FIG. 11 detailed hereafter only focuses on a situation wherein the AV live content targeted by the player PL 110 is not available in multicast form and has to be provided in unicast form from the server CDNS 123, which is anyway not aware of any multicast capability over the provider network PN 102.

Figure 11:
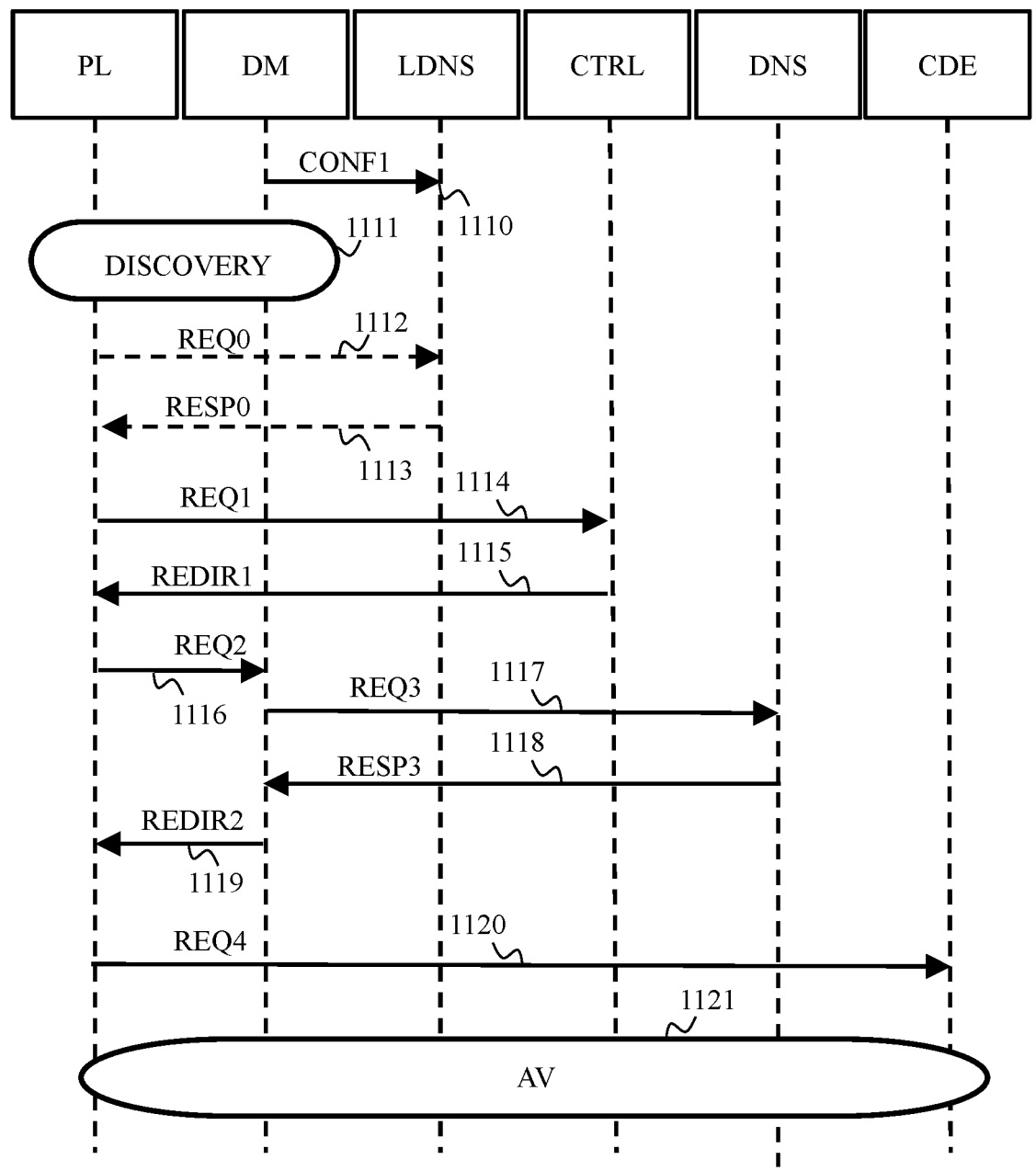
FIG. 11 schematically represents exchanges occurring in the fourth embodiment of the AV live content delivery system.

FIG. 11 schematically represents exchanges occurring in the fourth embodiment of the AV live content delivery system shown in FIG. 10.

The LDNS server 162 is configured via a configuration message CONF1 transmitted by the de-multicaster DM 150. Configuring the LDNS server 162 so that the LDNS server 162 is able to perform the domain name resolution and retrieve the address of the controller CTRL 130 is thus performed by the de-multicaster DM 150 when the de-multicaster DM 150 has been successfully installed in the gateway GW 140, in a step 1110, by transmitting to the LDNS server 162 a configuration message CONF1 providing an association between the FQDN of the URL of the AV live content targeted by the player PL 110 and the address for contacting the controller CTRL 130. As mentioned with respect to FIG. 7, this may in a variant be performed manually.

In a step 1111, the player PL 110 performs the discovery procedure in the LAN 101 (and/or through API), as already described with respect to the step 200 in FIG. 2A.

In a step 1112, the player PL 110 transmits the request REQ0 to the LDNS server 162. The request REQ0 requests resolution of the FQDN of the URL identifying the AV live content targeted by the player PL 110, namely tv.myISP.com in the example above. The LDNS server 162 performs the domain name resolution and thus retrieves the address of the controller CTRL 130. For instance, the domain name resolution leads to the following IP address: 72.68.18.14.

In a step 1113, the LDNS server 162 returns to the player PL 110 the retrieved address of the controller CTRL 130 in the response message RESP0. The player PL 110 is thus able to contact the controller CTRL 130.

In a step 1114, the player PL 110 transmits the request REQ1 to the controller CTRL 130 using the address obtained from the LDNS server 162. The request REQ1 is formed as already described.

In a step 1115, the controller CTRL 130 does not know whether the AV live content targeted by the player PL 110 is available or not in multicast form, and transmits in response to the request REQ1 the redirect message REDIR1. Continuing with the example above, the redirect message REDIR1 is for instance like the following HTTP REDIRECT 192.168.1.100:8000/SportsChannel1.mpd?FQDN_orig=tv.myISP.com&CDN_unicastServer=tv.myISP.com When receiving the redirect message REDIR1, the player PL 110 redirects its request to the de-multicaster DM 150 through the request REQ2 in a step 1116 in accordance with the redirect message REDIR1. Considering that the de-multicaster DM 150 notes that the AV live content targeted by the player PL 110 is not available in multicast form, the de-multicaster DM 150 transmits in response to the request REQ2, in a step 1119, the redirect message REDIR2.

In the redirect message REDIR2, the de-multicaster DM 150 has replaced the address (e.g., IP address and port number) as indicated in the request REQ2 by the address of the unicast server provided as inline parameter (i.e., inline parameter "CDN_unicastServer" in the example above) of the request REQ2.

Note that referring to the unicast server with the FQDN of the URL identifying the AV live content targeted by the player PL 110, namely tv.myISP.com, is particularly useful when the server CDNS 123 is managed by a different authority than the controller CTRL 130 and the de-multicaster DM 150. The de-multicaster DM 150, receiving the request REQ2 in the step 1116 may use services of a DNS client agent installed in the same machine as the de-multicaster DM 150 and in conjunction with said de-multicaster DM 150 so as to force domain name resolution by the DNS server 161 and avoid that the LDNS server 162, if any, be targeted by the domain name resolution.

The de-multicaster DM 150 requests the domain name resolution and the message REQ3 is transmitted accordingly in a step 1117. The DNS server 161 processes the request REQ3, performs the domain name resolution and thus retrieves the address of the server CDNS 123. For instance, the domain name resolution leads to the following IP address: 72.36.53.18. Then, in a step 1118, the DNS server 161 returns to the de-multicaster DM 150 the retrieved address of the server CDNS 123 in the response message RESP3.

Next, the de-multicaster DM 150 sends the redirect message REDIR2. Continuing with the example above, the redirect message REDIR2 is for instance as follows:

HTTP REDIRECT 72.36.53.18:80/SportsChannel1.mpd

When receiving the redirect message REDIR2, in a step 1120, the player PL 110 transmits the request REQ4 to the server CDNS 123, thereby requesting delivery of the AV live content in question from the server CDNS 123. Then, in a step 1121, the player PL 110 receives the AV live content in unicast form from the server CDNS 123 (i.e., without passing via the de-multicaster DM 150).

The invention claimed is:

1. A method for delivering a targeted audio-visual live content to a client, the method being performed by an audio-visual live content delivery system including:
the client located in a local area network interconnected to a provider network by a gateway providing access to the provider network or located in the gateway providing access to the provider network;
an audio-visual live content delivering equipment comprising one or more servers among which a multicaster for transmitting audio-visual live contents in multicast form via the provider network;
a de-multicaster in the gateway providing access to the provider network or in any device located in the local area network, the de-multicaster being able to perform a conversion in unicast form of audio-visual live contents received in multicast form from the multicaster via the provider network;
a controller managing routing of requests to get audio-visual live contents;
wherein the method comprises:
the client performs a discovery procedure aiming at receiving, from the gateway providing access to the provider network and from any device connected to the local area network, information on potential presence and availability of the de-multicaster on the local area network;
and when the client intends receiving the targeted audio-visual live content:
the client sends to the controller a request to get the targeted audio-visual live content, wherein the request to get the targeted audio-visual live content provides indication of presence and availability, or not, of the de-multicaster on the local area network;
the controller decides how redirecting the client to fulfill the request to get the targeted audio-visual live content, according at least to the indication of presence and availability, or not, of the de-multicaster on the local area network as provided by the client device in the request to get the targeted audio-visual live content.

2. The method according to claim 1, wherein the indication of presence and availability, or not, of the de-multicaster is implicitly provided in said request to get the targeted audio-visual live content, such that, in case of a presence and availability of the de-multicaster, the request to get the targeted audio-visual live content includes an inline parameter providing an address of the de-multicaster resulting from the discovery procedure.

3. The method according to claim 1, wherein the provider network enables uplink communications from the gateway and the local area network through the provider network, and the controller is located on the provider network, and wherein the controller redirects the client toward a unicast server of the audio-visual live content delivering equipment when the controller determines that the client cannot benefit from the conversion and redirects the client toward the de-multicaster otherwise.

4. The method according to claim 3, wherein the client determines an address to contact the controller by requesting domain name resolution to a domain name server located in the provider network, the domain name resolution concerning a fully qualified domain name included in a uniform resource locator identifying the targeted audio-visual live content.

5. The method according to claim 3, wherein the de-multicaster retrieves segments of the targeted audio-visual live content, which are lost in multicast form, from a repair unicast server of the audio-visual live content delivering equipment which receives the targeted audio-visual live content from the multicaster.

6. The method according to claim 3, wherein when redirecting the client toward the de-multicaster, the controller transmits a redirect message including an inline parameter providing the fully qualified domain name included in a uniform resource locator that was indicated in the request to get the targeted audio-visual live content and that identifies the targeted audio-visual live content, and wherein the de-multicaster redirects the client toward a unicast server on the provider network when the de-multicaster determines that the client cannot benefit from the conversion, the de-multicaster determining an address of said unicast server by requesting domain name resolution to a domain name server located in the provider network using the inline parameter providing said fully qualified domain name.

7. The method according to claim 1, wherein the provider network enables uplink communications from the gateway and the local area network through the provider network and the controller is located in the gateway or in the local area network, wherein the controller redirects the client toward a multicast non-aware unicast server on the provider network when the controller determines that the client cannot benefit from the conversion and redirects the client toward the de-multicaster otherwise.

8. The method according to claim 7, wherein the client determines an address to contact the controller by requesting domain name resolution to a local domain name server located in the gateway or in the local area network, the domain name resolution concerning a fully qualified domain name included in a uniform resource locator identifying the targeted audio-visual live content.

9. The method according to claim 8, wherein the controller has precedingly configured the local domain name server to associate said fully qualified domain name with an address of the controller.

10. The method according to claim 7, wherein, the controller and the de-multicaster being co-located in the same machine, the client determines an address to contact the controller by deriving said address to contact the controller from an address to contact the de-multicaster resulting from the discovery procedure.

11. The method according to claim 8, wherein the de-multicaster retrieves segments of the targeted audio-visual live content, which are lost in multicast form, from a repair unicast server of the audio-visual live content delivering equipment which receives the targeted audio-visual live content from the multicaster.

12. The method according to claim 8, wherein when redirecting the client toward the de-multicaster, the controller transmits a redirect message including an inline parameter providing the fully qualified domain name included in a uniform resource locator that was indicated in the request to get the targeted audio-visual live content and that identifies the targeted audio-visual live content, and wherein the de-multicaster redirects the client toward a multicast non-aware unicast server on the provider network when the de-multicaster determines that the client cannot benefit from the conversion, the de-multicaster determining an address of said multicast non-aware unicast server by requesting domain name resolution to a domain name server located in the provider network using the inline parameter providing said fully qualified domain name.

13. The method according to claim 1, wherein the provider network does not enable uplink communications from the gateway and the local area network through the provider network and the controller is located in the gateway or in the local area network, wherein the controller rejects the request to get the targeted audio-visual live content when the controller determines that the client cannot benefit from the conversion and redirects the client toward the de-multicaster otherwise.

14. The method according to claim 13, wherein the client determines an address to contact the controller by requesting domain name resolution to a local domain name server located in the gateway or in the local area network, the domain name resolution concerning a fully qualified domain name included in a uniform resource locator identifying the targeted audio-visual live content.

15. The method according to claim 14, wherein the de-multicaster has precedingly configured the local domain name server to associate said fully qualified domain name with an address of the controller.

16. The method according to claim 13, wherein, the controller and the de-multicaster being co-located in the same machine, the client determines an address to contact the controller by deriving said address to contact the controller from an address to contact the de-multicaster resulting from the discovery procedure.

17. An audio-visual live content delivery system including:
   a client located in a local area network interconnected to a provider network by a gateway providing access to the provider network or located in the gateway providing access to the provider network;
   an audio-visual live content delivering equipment comprising one or more servers among which a multicaster for transmitting audio-visual live contents in multicast form via the provider network;
   a de-multicaster in the gateway providing access to the provider network or in any device located in the local area network, the de-multicaster being able to perform a conversion in unicast form of audio-visual live contents received in multicast form from the multicaster via the provider network;
   a controller managing routing of requests to get audio-visual live contents;
   wherein:
   the client comprises means for performing a discovery procedure aiming at receiving, from the gateway providing access to the provider network and from any device connected to the local area network, information on potential presence and availability of the de-multicaster on the local area network;
   the client comprises means for sending to the controller, when the client intends receiving the targeted audio-visual live content, a request to get the targeted audio-visual live content, wherein the request to get the targeted audio-visual live content provides indication of presence and availability, or not, of the de-multicaster on the local area network;
   the controller decides how redirecting the client to fulfill the request to get the targeted audio-visual live content, according at least to the indication of presence and availability, or not, of the de-multicaster on the local area network as provided by the client device in the request to get the targeted audio-visual live content.

* * * * *